(12) United States Patent
Vignali (10) Patent No.: US 10,567,541 B2
(45) Date of Patent: Feb. 18, 2020

(54) NETWORK COMMUNICATION SYSTEM AND METHOD WITH WEB PUSH PROTOCOL

(71) Applicant: GLOBAL EAGLE ENTERTAINMENT INC., Los Angeles, CA (US)

(72) Inventor: Claudio Vignali, Miramar, FL (US)

(73) Assignee: GLOBAL EAGLE ENTERTAINMENT INC., Los Angeles, CA (US)

(*) Notice: Subject to any disclaimer, the term of this patent is extended or adjusted under 35 U.S.C. 154(b) by 81 days.

(21) Appl. No.: 15/138,874

(22) Filed: Apr. 26, 2016

(65) Prior Publication Data

US 2017/0237824 A1    Aug. 17, 2017

Related U.S. Application Data

(60) Provisional application No. 62/295,399, filed on Feb. 15, 2016.

(51) Int. Cl.
*H04L 29/08* (2006.01)
*H04B 7/185* (2006.01)
*H04L 29/06* (2006.01)

(52) U.S. Cl.
CPC ....... *H04L 67/2847* (2013.01); *H04B 7/1851* (2013.01); *H04L 67/02* (2013.01);
(Continued)

(58) Field of Classification Search
CPC ..... H04L 67/42; H04L 67/2876; H04L 67/02; H04L 67/289; H04L 67/2895; H04L 67/2847; H04B 7/1851
See application file for complete search history.

(56) References Cited

U.S. PATENT DOCUMENTS 6,658,463 B1\* 12/2003 Dillon ............... H04L 29/12132
709/203
2002/0073167 A1\* 6/2002 Powell ............... H04L 12/5692
709/217

(Continued)

FOREIGN PATENT DOCUMENTS

WO    99/08429 A1    2/1999

OTHER PUBLICATIONS

European Patent Office, European Search Report for European Publication No. EP 3 206 376 A1, dated Jun. 6, 2017, 2 pages.

(Continued)

*Primary Examiner* — Shean Tokuta
*Assistant Examiner* — Juan C Turriate Gastulo
(74) *Attorney, Agent, or Firm* — SoCal IP Law Group LLP; Steven C. Sereboff; Jonathan Pearce (57) ABSTRACT

A communication system includes a Remote Proxy device and an Edge Proxy device. The Remote Proxy receives a request for a website from a user terminal, and transmits the request to the Edge Proxy via satellite. The Edge Proxy receives the request and transmits the request to a Web Server over a high speed connection. The Edge Proxy receives the response from the Web Server, and transmits the response to the Remote Proxy via satellite, which then transmits the response to the User Terminal. The Edge Proxy also reviews the response and requests objects for the website from the Web Server, and transmits the objects to the Remote Proxy, which then transmits it to the User Terminal.

20 Claims, 6 Drawing Sheets

(52) U.S. Cl.
CPC ........ *H04L 67/289* (2013.01); *H04L 67/2876* (2013.01); *H04L 67/2895* (2013.01); *H04L 67/42* (2013.01)

(56) References Cited

U.S. PATENT DOCUMENTS

| | | | |
|---|---|---|---|
| 2003/0112772 A1* | 6/2003 | Chatterjee | H04B 7/1858 370/316 |
| 2003/0120658 A1* | 6/2003 | Carneal | G06F 17/30902 |
| 2005/0108517 A1 | 5/2005 | Dillon et al. | |
| 2007/0143008 A1* | 6/2007 | Choi | H04L 69/40 701/408 |
| 2008/0270686 A1* | 10/2008 | Grannan | G06Q 30/02 711/113 |
| 2015/0319042 A1* | 11/2015 | Palchaudhuri | H04L 12/4641 370/395.53 |

OTHER PUBLICATIONS

European Patent Office, Office Action for European application No. 17 155 705.1-1213, dated Feb. 1, 2019, total of 6 pages.

\* cited by examiner

NETWORK COMMUNICATION SYSTEM AND METHOD WITH WEB PUSH PROTOCOL

RELATED APPLICATION

This application claims the benefit of U.S. Provisional Application No. 62/295,399, filed Feb. 15, 2016, the entire contents of which are incorporated herein by reference.

BACKGROUND OF THE INVENTION

Field of the Invention

The present invention relates to network communications. More particularly, the present invention relates to communication of website and Internet information via satellite.

Background of the Related Art

Client devices called "web browsers" often receive and request information from server devices in computer networks. The use of the World Wide Web is a common example of a client-server interaction. When using the Web, the client or "web-browser" will embed network objects from a web server (website) and also requests web pages.

Figure 2:
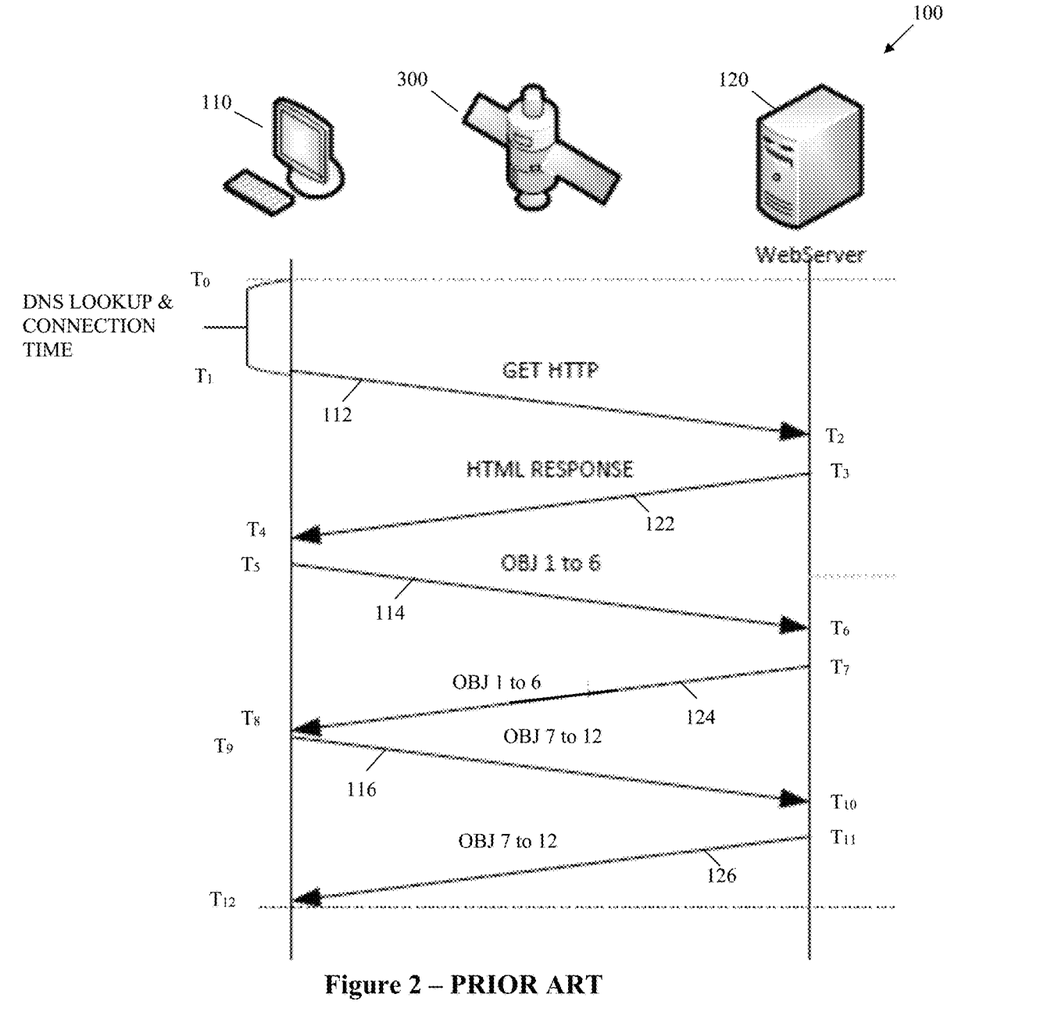
FIG. 2 is a timing diagram showing the communications made to deliver web content via satellite in a conventional system.

FIG. 2 shows the general operation for a user terminal 110 to request and receive information from a web server 120. Starting at time $T_0$, the user enters a website, such as by entering a domain name (e.g., www.EMCSatcom.com) address in the domain address entry box of a web browser or by clicking on a link to a certain domain. In response, the terminal 110 performs a Domain Name System (DNS) lookup, whereby the terminal 110 determines the IP address associated with the requested domain name. The time from $T_0$ to $T_1$ represents the DNS lookup and the connection time.

At time $T_1$, the terminal 110 has the IP address and is connected to the web server, and sends a GET HTTP command 112 to the web server 120. The GET HTTP command 112 (e.g., "GET www.emcsatcom.com") requests certain data from the web server 120, for instance the home page of a particular web site. At time $T_2$, the server 120 the command 112 is received at the web server 120. The period of time from $T_1$ to $T_2$ is the initial latency of the system, which is about 300 ms for satellite (600 ms roundtrip RTT). At time $T_3$, the web server 120 has processed the information and transmits a response to the command 112 with an HTML RESPONSE 122 to the server. At time $T_4$, the terminal 110 receives the HTML RESPONSE 122, and at time $T_5$ has parsed the HTML and the terminal 110 begin sending an request commands in signal 114 for information needed for the website being accessed, such as images, javascripts, and CSS (Cascading Style Sheet) (which is collectively referred to here as "objects" and represented by objects 1-6 in the figures).

The browser opens a number of parallel connections for the number of objects on a page (usually about six) and sends a request for each object. At time $T_6$, the server 120 receives the requests 114, and at time $T_7$ sends the requested objects 124. At time $T_8$, the terminal 110 receives the initial images 1-6, and at time $T_9$ sends a second request commands batch in signal 116 for the final objects (objects 7-12 in the example shown). At time $T_{10}$, the server 120 receives the signal 116, and at time $T_{11}$ sends the objects 126 to the terminal 110. Finally at time $T_{12}$, the terminal 110 receives the final objects and the page load is complete.

Thus, the difference between $T_0$ and $T_{12}$ represents the total time to complete the transaction for a web page with only 12 objects. The command signals 112, 114, 116 are all transmitted via satellite 300 from the terminal 110 to the server 120. And, the response signals 122, 124, 126 are transmitted via satellite 300 from the server 120 to the terminal 110.

A known problem for web clients using Satellite internet technologies is the delay experienced by the user. In the example of FIG. 2, most of the time for completing the website request is due to the latency at the satellite 300. There can be significant latency between the time it takes for the web page to be requested from the server, and the time the web browser presents the web page to the user. This type of delay is usually caused by the network distance to the web server, the size of the web page, the load of the web server or other factors. Reducing the latency and wait time experienced by Satellite internet users for web pages to be delivered and presented from the web server would be beneficial.

Figure 1A:
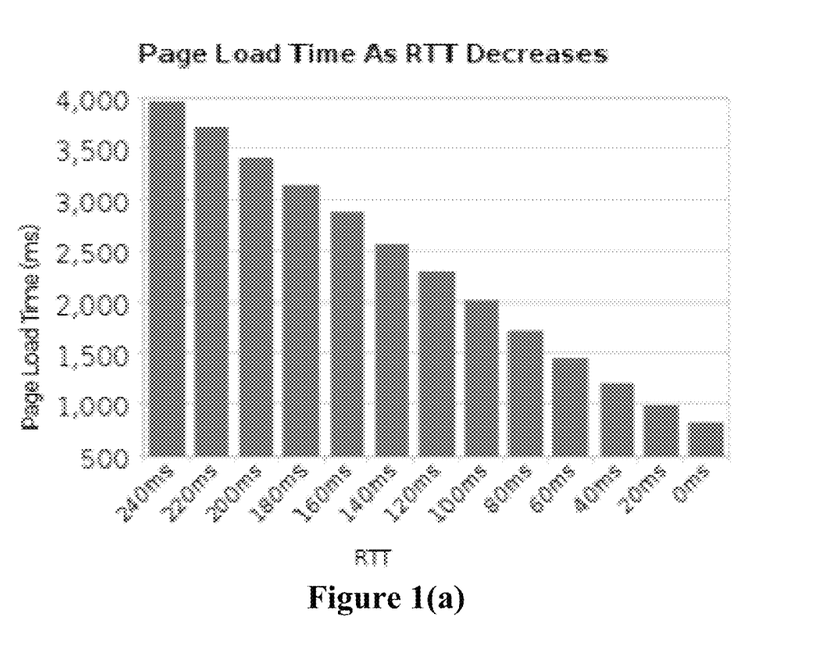
FIG. 1(a) is a graph showing the page load time as RTT decreases.

In places where the only option to have access to internet wireless technologies is Satellite, the user's navigation experience is reduced, regardless of the bandwidth. The reason is because the latency, also called the Round Trip Time (RTT) causes this delay. RTT is related to the long distance that the packets need to travel from the remote location to the satellite in space then to the base station (teleport) and back forward. FIG. 1(a) shows the effect of a high RTT for a page load where the bandwidth is not an issue, and how the page load's time is affected by the RTT.

Figure 1B:
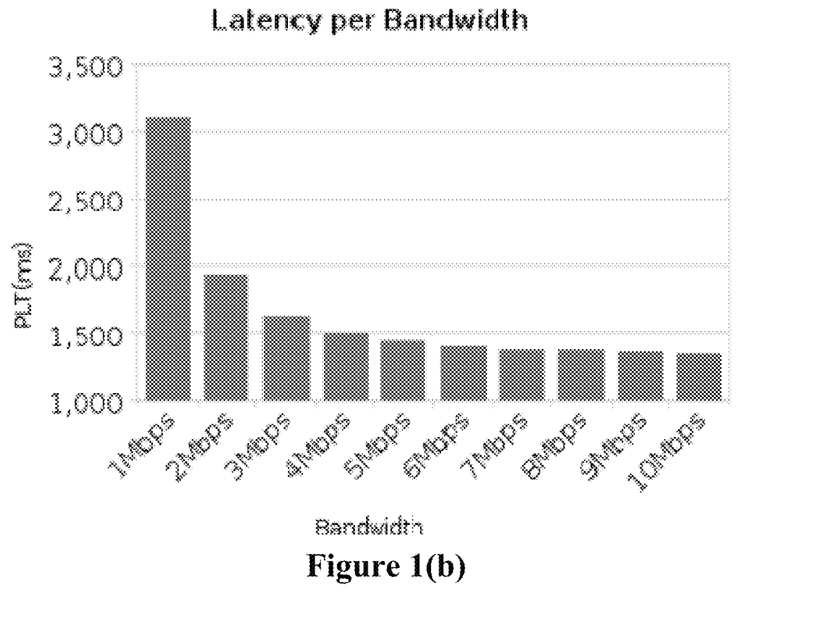
FIG. 1(b) is a graph showing the latency per bandwidth.

In contrast, FIG. 1(b) shows the low impact that increasing the Bandwidth has after overcoming the minimum Bandwidth needed to not saturate a link with a web page request:

One of the methods commonly used to solve this problem is to provide a cache in the local devices for the user, or to have a separated device in the local network that can provide cache to multiple users.

The problem with this common approach is that it is limited. Only specific content can be optimized with a cache system because in order to increase the speed of the web pages being delivered, content needed to be previously requested by other users or the same user.

In addition, the standard web cache system can only cache what the web developers indicate can be cache using labels in the HTTP headers. However, some cache systems are capable of detecting cacheable data at a byte level, but typically they require a lot of resources to detect some variations in data.

Furthermore, encrypted information cannot be cached. Approximately 40% to 80% of the web traffic today is encrypted using HTTPS protocol. Because of this, Cache Systems are blind and cannot cache any of this type of information.

The existing solutions are very useful, but only effective if a user has previously requested the same public web page. Based on this premise, the more people use the same Cache device it increases the probability of hitting the Cache, thus reducing the latency for a web page to load. Therefore, Caching solutions work and have better results in places where more people are using the system, and are less effective when there are fewer people using it.

In other premium markets where the cost of Bandwidth is not a limitation, a different problem arises. Regardless of how much Bandwidth is available to a user at any one time, because of the latency and the way TCP and HTTP protocol works, the users cannot receive the maximum Bandwidth that they are paying for while browsing the internet. For example, if a user has a link with more than 5 mbps available and request a web page or he/she is downloading a file, the typical throughput without any optimization will be around 1-2 mbps only because the effect that the latency has in the TCP protocol.

Other methods that helps to fix the high RTT problem, are protocols like Spdy, QUIC or HTTP 2.0. Some of the problems related to latency are reduced because Web Sever now can send objects without the need of waiting for a Request, however the adoption of these technologies has not being fast enough because of the trade off in complexities for developers that want to use it. These protocols can help with latency problems, but this is just one small piece of the whole problem when internet links are saturated, because pushing objects in advance will work only if the link is free to send it to the final user.

SUMMARY OF THE INVENTION

Accordingly, a communication system includes a Remote Proxy device and an Edge Proxy device. The Remote Proxy receives a request for a website from a user terminal, and transmits the request to the Edge Proxy via satellite. The Edge Proxy receives the request and transmits the request to a Web Server over a high speed connection. The Edge Proxy receives the response from the Web Server, and transmits the response to the Remote Proxy via satellite, which then transmits the response to the User Terminal. The Edge Proxy also reviews the response and requests objects for the website from the Web Server, and transmits the objects to the Remote Proxy, which then transmits it to the User Terminal.

In a first embodiment, a system is provided for communicating data from a first computer to a second computer remotely located from the first computer, the system comprising: a first proxy device configured to receive a request from the first computer and transmit the request via satellite; and a second proxy device configured to receive the request from the first proxy device via satellite and transmit the first request to the second computer via a high speed connection, said second proxy device receiving a response from the second computer and transmitting the response via satellite; wherein said first proxy device further configured to receive the response from the second proxy device via satellite and transmit the response to the first computer.

A second embodiment is provided according to the first embodiment, wherein the request comprises a GET HTTP command signal. A third embodiment is provided according to each of the previous embodiments, wherein the second proxy device is further configured to review the response and determine further information needed, and transmit a further request to the second computer for the further information. A fourth embodiment is provided according to each of the previous embodiments, wherein the second proxy device is further configured to receive a further response from the second computer and transmit the further response to the first proxy device via satellite, and wherein the first proxy device is further configured to receive the further response via satellite and transmit the further information to the first computer.

A fifth embodiment is provided according to each of the previous embodiments, wherein the request is for a website. A sixth embodiment is provided according to each of the previous embodiments, wherein the first computer is a user terminal and the second computer is a web server. A seventh embodiment is provided according to each of the previous embodiments, wherein said first proxy device is further configured to determine if a response is not received from the second proxy device within a predetermined time, and re-transmit the request via satellite if the response is not received from the second proxy device within the predetermined time. An eighth embodiment is provided according to each of the previous embodiments, wherein the second proxy device transmits the response over a satellite link and the first proxy device receives the response over the satellite link, and the first and second proxy devices are further configured to determine if the satellite link fails during transmission of the response and to resume the transmission of the response once the satellite link resumes.

A ninth embodiment is provided according to each of the previous embodiments, further comprising a cache in communication with the first proxy device. A tenth embodiment is provided according to each of the previous embodiments, wherein said second proxy is further configured to determine popular websites and multicast popular websites to the first proxy device via satellite, said first proxy device configured to store the popular websites at said cache. An eleventh embodiment is provided according to each of the previous embodiments, wherein said first proxy device is further configured to determine if the request from the first computer corresponds to information stored in the cache, retrieve the requested information from the cache, and transmit the requested information to the first computer.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 3:
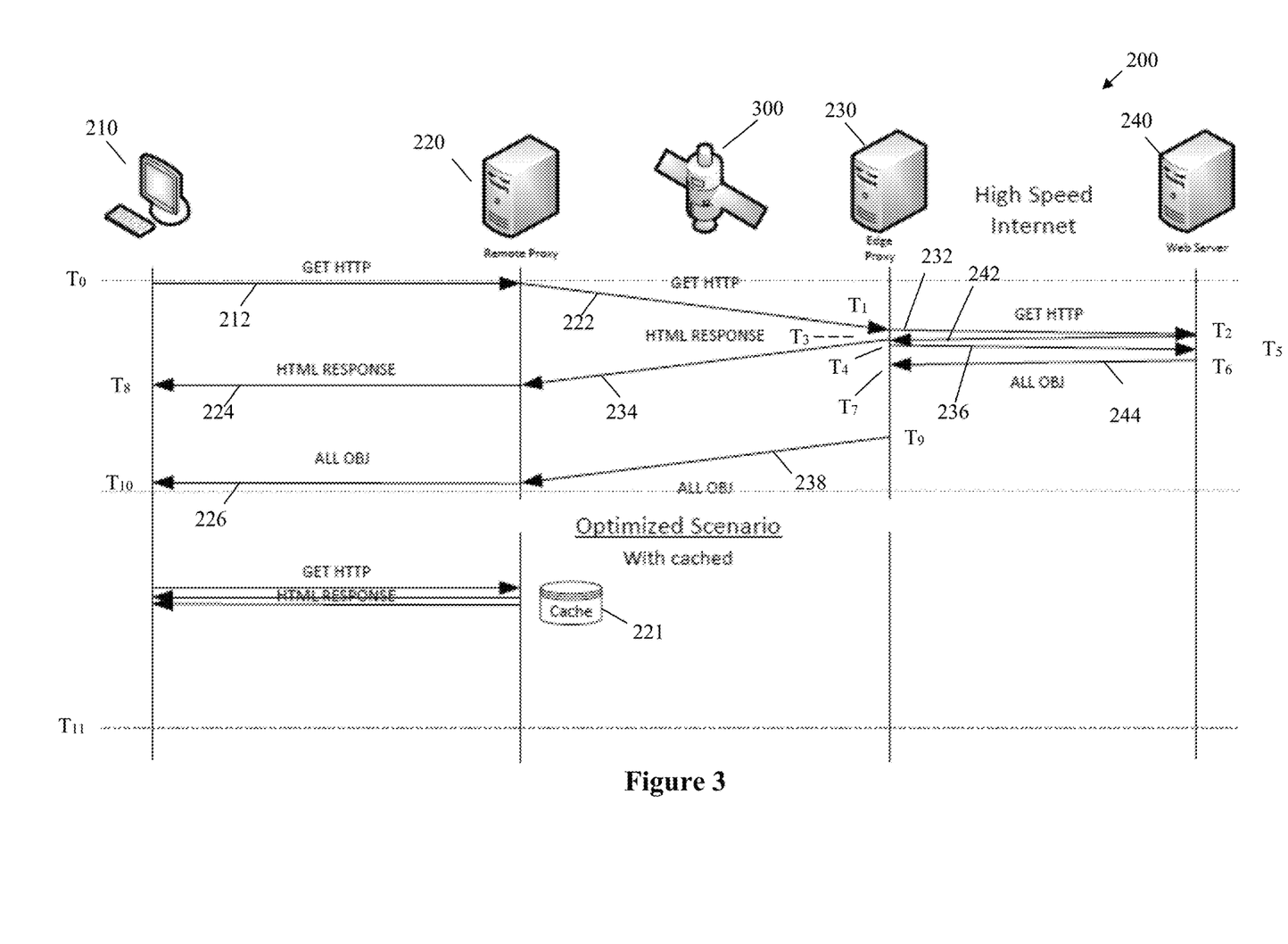
FIG. 3 is a timing diagram showing the communications made to deliver web content via satellite in accordance with the system and method of the present invention.
Figure 4:
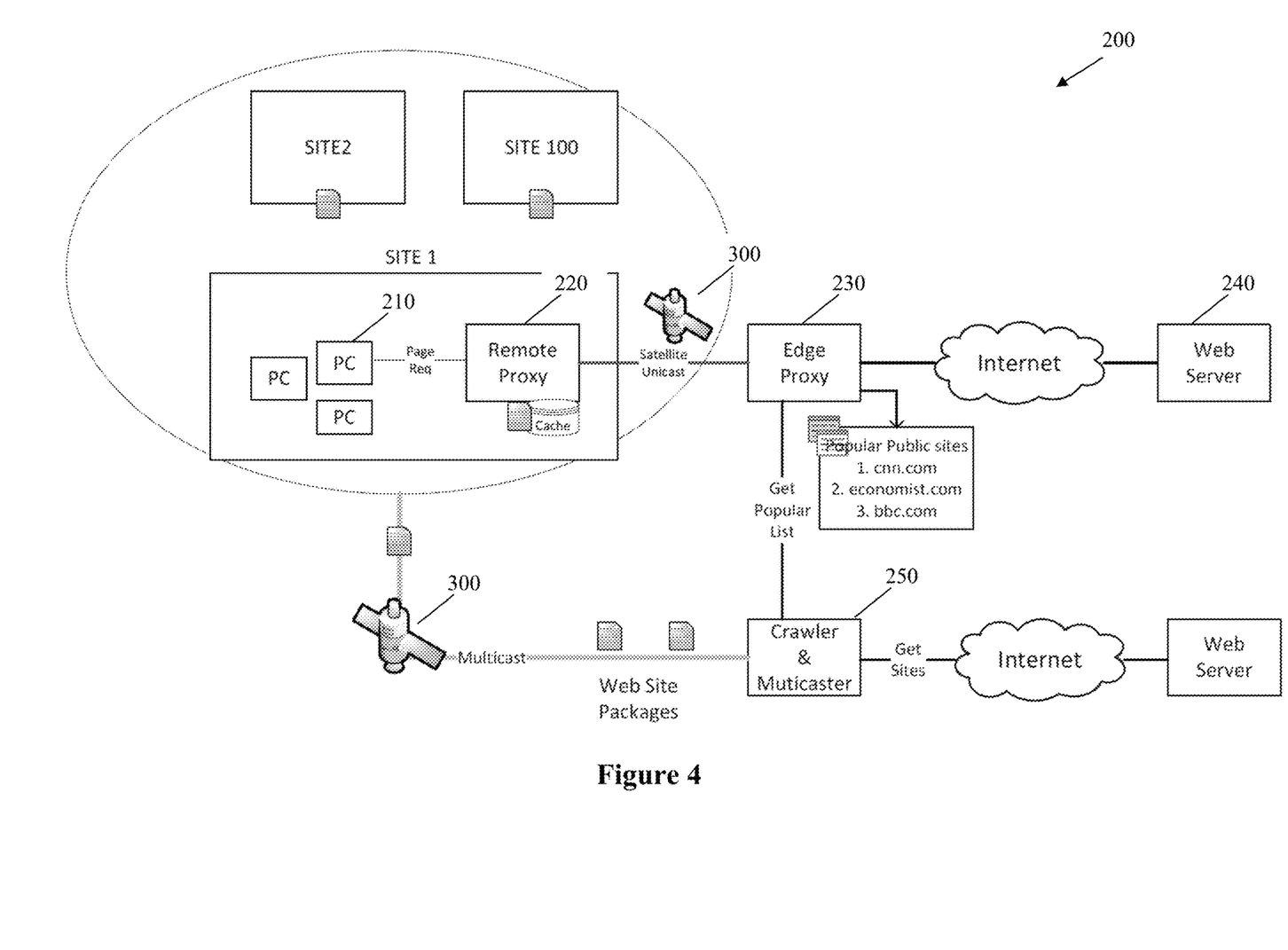
FIG. 4 is a block diagram illustrating the system of the present invention used to deliver web content via satellite.

Turning to FIG. 3, a communication system 200 is shown for implementing a push protocol in accordance with the invention. As shown, the system 200 includes a Remote Proxy 220 and an Edge Proxy 230. The Remote Proxy 220 and the Edge Proxy 230 are positioned between the User Terminal 210 and the Web Server 240. Though only one Remote Proxy 220 and one Edge Proxy 230 are shown, multiple Remote Proxys 220 and multiple Edge Proxies 230 can be provided. Though only one User Terminal 210 and one Web Server 240 are shown in FIG. 3, it will be appreciated that each Remote Proxy 220 can communicate with multiple User Terminals 210 in the same Local Area Network (LAN), and each Edge Proxy 230 can communicate with multiple Web Servers 240, as shown in FIG. 4. In one embodiment, the Remote Proxys 220 and Edge Proxys 230 can each be provided in a different geographic area.

The User Terminal 210 communicates with the Remote Proxy 220, and all communications from the User Terminal 210 go through the Remote Proxy 220. In addition, the Edge Proxy 230 communicates with the Web Server 240 over a high speed Internet connection, and all communications with the Web Server 240 go through the Edge Proxy 230. The Remote Proxy 220 communicates with the Edge Proxy 230 via the Satellite 300.

As further shown in FIG. 4, the system may further include a crawler & multicaster 250. The Crawler & Multicaster 250 is in communication with the Edge Proxy 230, and can be part of the Edge Proxy 230 or a separate component that is either located at the same site as the Edge Proxy 230 or located remote from the Edge Proxy 230. Communications between the Remote Proxy 220 and the Edge Proxy 230 can be conducted in a unicast mode via a unicast satellite 300b, and also in a multicast mode via a multicast satellite 300a and the crawler & multicaster 250. The unicast satellite 300b can be the same or different as the multicast satellite 300a. Where the satellites 300a, b are the same, the unicast communications can be conducted over different channels as the multicast communications.

Multicast communications may include, for instance, trending objects like videos or images of popular websites requested for a particular user Terminal 210 in one site. So instead of sending it over a Unicast, it is sent over Multicast and is cached at all of the Remote Proxies 220. Whereas unicast communications may include, for instance, requests for less popular websites or information that the Edge Proxy 230 sends to one Remote Proxy 220 for one User Terminal 210.

The Push Protocol

FIG. 3 shows an illustrative, non-limiting operation of the system 200, whereby the user wants to display a particular website at the User Terminal 210. Starting at time $T_0$, the user enters a site address at the User Terminal 210, such as by entering the domain or clicking on a link for a domain. Notably, the User Terminal 210 doesn't need to perform a DNS lookup. The Terminal 210 transmits a GET HTTP command signal 212 to the Remote Proxy 220, which is nearly instantaneously received in real time at the Remote Proxy 220. In response, the Remote Proxy 220 immediately transmits the GET HTML command signal 222 to the Edge Proxy 230 via the Satellite 300. At time $T_1$, the Edge Proxy 230 receives the GET HTTP command signal 222, and transmits the GET HTTP command signal 232 to the Web Server 240. At time $T_2$, the Web Server 240 receives the command signal 232, and instantly sends an HTML response signal 242 to the Edge Proxy 230.

At time $T_3$, the Edge Proxy 230 receives the HTML response signal and immediately transmits an HTML response signal 234 to the Remote Proxy 220 via the Satellite 300. At the same time or immediately thereafter at time $T_4$, the Edge Proxy 230 processes the HTML received from the Web Server 240 to get all the objects (e.g., images, CSS, JavaScripts) that are needed for the requested website, and starts requesting those objects from the Web Server 240. Thus, the Edge Proxy 230 transmits a request signal 236 to the Web Server 240, requesting the objects/images in the domain. At time $T_5$, the Web Server 240 receives the request signal 236, and at time $T_6$ the Web Server 240 transmits all the objects to the Edge Proxy 230 via a response signal 244. At time $T_7$ the Edge Proxy 230 has received all the object data from the response signal 244.

Since the command signals 232, 236 are transmitted over a high speed Internet connection, they are nearly instantaneously received and processed by the Web Server 240. In addition, since the response signals 242, 244 from the Web Server 240 are also transmitted over a high speed connection, they are nearly instantaneously received and processed by the Edge Proxy 230. Thus, the period of time for the Edge Proxy 230 to initially request the information from the Web Server 240 (at time $T_1$) until it subsequently receive all the requested information for that domain (at time $T_7$), is relatively short (e.g., for a page that can normally take 40 seconds to load in FIG. 1, can be loaded in less than 3 seconds).

Referring again to time $T_3$, the Edge Proxy 230 has transmitted an HTML RESPONSE signal 234 to the Remote Proxy 220 via the Satellite 300. At the same time that the HTML RESPONSE signal 234 is being communicated via Satellite 300, the Edge Proxy 230 is communicating with the Web Server 240 to receive all the object data at response signal 244. At time $T_8$, the Remote Proxy 220 has received the HTML RESPONSE signal 234, and transmitted an HTML RESPONSE signal 224 to the User Terminal 210. That response signal 224 is nearly instantly received by the user Terminal 210.

When the user terminal 210 receives the response 224, the browser will process the HTML the same way the Edge Proxy 230 had processed it when the Edge Proxy 230 received the same HTML response 242. The user terminal 210 starts to request all the objects in the requested web page. However most of the objects are already in the Remote Proxy 220 and stored in the cache 221, because they have already been sent by signal 238, which is before the browser at the User Terminal 210 requests them. At time $T_{10}$ the browser receives all the objects. The time between $T_8$ and $T_{10}$ is typically the time needed for the Local Remote Proxy 220 to receive all the objects pushed over the satellite 300 from the Edge Proxy 230, and will be proportional with the bandwidth assigned to that Remote Proxy 220. So the bigger the bandwidth, the less time will take to download all the objects inside the Web Page at the User Terminal 210.

The communications between the User Terminal 110 and the Webserver 120 of FIG. 2 are now performed between the User Terminal 210 and the Remote Proxy 220 in FIG. 3. At time $T_8$, the User Terminal 210 requests all the objects from the Remote Proxy 220. Notably, the User Terminal 210 does not directly communicate with the Web Server 240 at all. Instead, the Edge Proxy 230 handles all requests for object data and any other necessary data. So by the time the User Terminal 210 requests the objects (after $T_8$), they have been sent by the Remote Proxy 220 to the User Terminal 210 (or to the Remote Proxy 220 and stored in the cache 221). Thus, User Terminal 210 will have the requested objects, or the requested objects can be sent from the cache 221 by the Remote Proxy 220.

As noted at time $T_7$, the Edge Proxy 230 has received all the object data needed for the domain requested by the user. At time $T_9$, the Edge proxy transmits that last object data in a response signal 238 to the Remote Proxy via the Satellite 300. It is noted that the typical speed of the high speed internet communications between the Edge Proxy 230 and the Web Server 240 can be about 1 gbps (Giga bit per second), whereas the typical speed of a satellite link can be 5 mbps (Mega bit per second). Consequently, there can be a delay from the time $T_7$ when the Edge Proxy 23 has received all the object data, to time $T_9$ when the last object data is transmitted to the satellite 300 as signal 238. The actual time from $T_7$ to $T_9$ depends on the amount of data to be transmitted, the bandwidth for the satellite link and the bandwidth in the teleport. As shown, that transmission signal 238 is all of the object data needed for the web site, not just part of the object data.

As further represented, that transmission signal 238 is sent without the User Terminal 210 or the Remote Proxy 220 having to send a request for it because the Edge Proxy 230 had requested the information in advance and without receiving a request from the User Terminal 210 or the Remote Proxy 220. In this way, the system 200 expedites delivery of the object data by having the request made by the Edge Proxy 230 over the fastest connection in the system 200, namely over the high speed Internet connection between the Edge Proxy 230 and the Web Server 240.

Finally, at time $T_{10}$, the Remote Proxy 220 receives all the object data from response signal 238, and sends that to the User Terminal 210 over response signal 226. Accordingly at $T_{10}$, the User Terminal 210 has all the information for the requested web page and can render a complete version of the web page. The entire time period from the initial request at time $T_0$ until all the information is received at time $T_{10}$, is much shorter than the time required by the conventional system of FIG. 3, as represented by time $T_{12}$ (FIG. 2). As illustrated in FIG. 3, the only delay is due to the bandwidth capacity of the satellite 300, whereas in FIG. 2 the delay is due to the latency of the system having to transmit an increased number of signals back and forth over the satellite 300. The present invention reduces the amount of information that is transmitted via the satellite 300, which in turn reduces the overall latency.

One objective of the Push protocol of FIG. 3 is to reduce the effect of high latency networks. For instance, the system 200 reduces the amount of communication that is transmitted over the satellite 300.

As further shown in FIG. 3, the Remote Proxy 220 has or is in communication with a cache 221. The Remote Proxy 220 stores in the cache 221, the data received from the HTML response signal 234 and all the object data on response signal 238. Accordingly, if the User Terminal 210 requests that same web site again, it will retrieve the requested information from the cache 221, and not send any request to the Edge Proxy 230. The Remote Proxy 220 can determine what information to store in the cache 221 and how often that information is to be updated.

The system 200 provides pre-established connections at the Edge Proxy 230. When the Remote Proxy 220 starts up, it establishes from the beginning several connections with the Edge Proxy 230 for HTTP and HTTPS. The pre-established connections reduce the connection time over the satellite 300. Thus, when a request is needed to be sent, a pre-established connection can be used instead of having to connect to the Edge Proxy 230 (i.e., to the Web Server 240). The amount of connections that are pre-established depends of the Bandwidth and the estimated amount of concurrent users. The pre-established connections can be, for instance, 50 HTTP and 50 HTTPS (i.e., TCP sockets), though any suitable number can be utilized. All the web requests generated by all users will go through these static connections and same for Response to the users.

The system 200 (specifically the static connections between the Remote Proxy 220 and the Edge Proxy 230) removes the overhead of establishing a TCP connection that otherwise would go from the browser to the Web Server 240 because the connections are being established between the browser and the Remote Proxy 220 locally and the pre-established connections are used between the Remote Proxy 220 and the Edge Proxy 230 to communicate with the Web Server 240. Thus when a browser requests a web page, the User Terminal 210 will connect directly to the local Remote Proxy Server 220 with no latency in the LAN, and the request will be sent to the Web Server 240 using the pre-established connections from the Remote Proxy 220 to the Edge Proxy 230 and because of this the system 200 saves the connection time (about 250 ms per connection).

More importantly, these pre-established connections are used in the Edge Proxy 230 to use all available channels to maximum throughput, such as by multiplexing the signals. Each connection (i.e., TCP socket) has natural throughput limit on high latency networks that the present invention avoids by having these pre-established connections; because instead of sending the object over a single connection, the system uses the pre-established connections to multiplex the object and increase the total throughput of the system. When a request is received in the Edge Proxy 230 from the Remote Proxy 220, it is queued at the Remote Proxy 220 to be processed (e.g., by worker threads). And when a response arrives at the Edge Proxy 230 from the Web Server 240, the Edge Proxy 230 (e.g., worker threads) use any available pre-established connection to send it to the Remote Proxy 220.

All pre-established connection are used at the maximum capacity all the time, even if there is a delayed response at a particular Web Server 240 for a particular website, since the Edge Proxy 230 can process other responses while it is waiting for the delayed response. The workers thread at the Edge Proxy 230 control connections to the Web Server 240. The workers thread wait for responses (i.e., signals 242, 244) from the Web Server 240, which can take up to several seconds. The Edge Proxy 230 (worker thread) knows if a pre-established connection is idle or active. Thus when a response arrives, the workers thread (at the Edge Proxy 23) request an available (i.e., idle) pre-established connection and transmit the response (i.e., 234, 238) to the Remote Proxy 220 over that identified pre-established connection.

In addition, DNS look-up is performed at the Edge Proxy 230. In a normal scenario, the DNS lookup can take several seconds in a High latency network. But in the present invention, the DNS lookup is done at the Edge Proxy 230 at very high speed. In many networks DNS are located in the WAN, and to request the IP of a new Domain requires a round trip message over the Link at high latency. In the system 200 of the present invention, the request for a web page (GET domain.com) will go to the Edge Proxy 230 using the pre-established connections, and the Edge Proxy 230 performs the DNS lookup in a high speed Internet connection with low latency. The Edge Proxy 230 can perform DNS requests of multiple Web Servers 240 prior to $T_1$. Accordingly, when the Edge Proxy 230 receives the GET HTTP command signal 222 from the Remote Proxy 220, the Edge Proxy 230 performs a DNS query (which is very quick over the high speed internet connection, often less than 20 ms).

The system 200 also processes HTML and Pre-fetches content. When a Web page is requested and the response is received in the Edge Proxy 230, the Edge Proxy 230 parses the HTML to get all the objects that are going to be requested by the browser when it received the same HTML. So, instead of waiting for the browser at the User Terminal 210 to receive the HTML and process it to start requesting all the Objects, the Edge Proxy 230 processes all the requests in advance in order to send it to the Remote Proxy 220 even before the browser at the User Terminal 210 requests that information.

Accordingly, the system 200 is a complete solution for high latency environments like Satellite with or without Bandwidth restrictions that can correct immediately the effect of the high latency, improving the navigation experience. Placing a Cache Device 221 in the Remote Proxy 220, and an Edge Proxy 230 with high bandwidth and low latency to the Internet. The Edge Proxy 230 can download and process all requests for the Remote Proxy 220 very fast and apply rules to optimize the usage of the Bandwidth.

The cache device 221 can store all the cache data related to a user's behavior, but more importantly the local cache 221 can receive in advance all of the objects related to a Page Request made by the user. The Edge Proxy 230 is able to very quickly process a web page request and can get all the objects and send them in advance before the user's browser requests them. Due to the high RTT, most of the objects needed to begin the rendering of the webpage will already be available in the local cache 221 when the browser requests them and will be immediately sent to the User's Terminal 210.

HTTP Error Correction and Download Protection

The internal protocol between the Remote Proxy 220 and the Edge Proxy 230 allows the system 200 to implement several mechanisms to ensure more reliability browsing, including HTTP error correction and download protection. Standard HTTP doesn't have any Error Correction and in many cases when a link is failing or saturated, many requests are discarded and responses never arrive to the browser.

Figure 5:
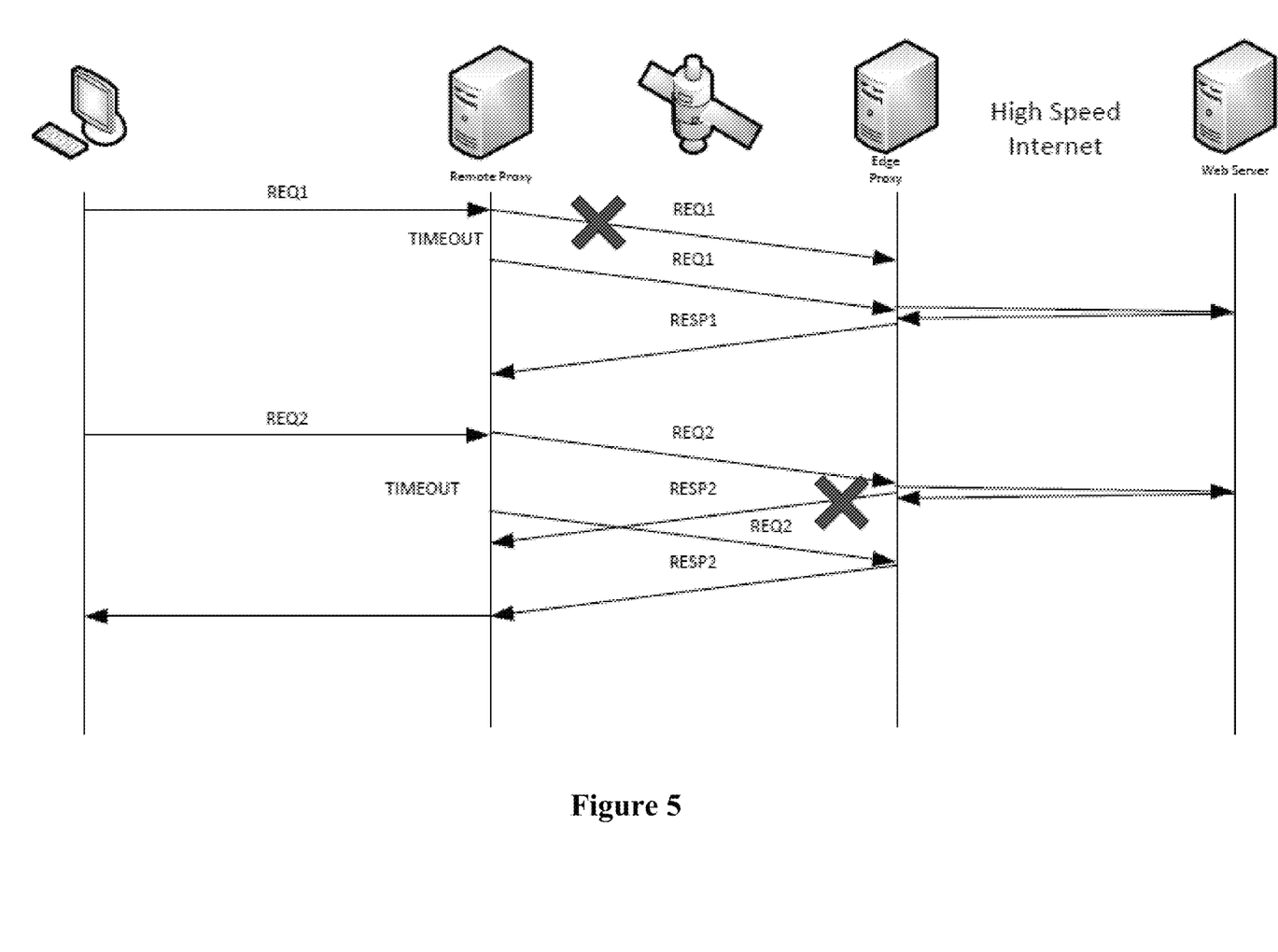
FIG. 5 is a timing diagram illustrating the use of error correction over HTTP in the present invention due to a failed request from the Remote Proxy to the Edge Proxy, and a failed response from the Edge Proxy to the Remote Proxy.

In order to correct problems that may occur when a user request a web page or is downloading a big file over internet, a NACK (Non acknowledge) protocol is provided to notify when a response was not received in certain amount of time, so request is sent again transparently to the User Terminal 210. Referring to FIG. 5, a first illustrative example is shown where the first request REQ1 (such as the GET HTTP command signal 222 (FIG. 3)) transmitted from the Remote Proxy 220 fails and is not received by the Edge Proxy 230. The Remote Proxy 220 expects to receive a response within a certain predetermined period of time (e.g., time $T_8$ in FIG. 3). If a response is not received within that predetermined period of time, the Remote Proxy 220 will automatically re-send the same request REQ1 and await the response.

In another example of the NACK protocol, the Remote Proxy 220 sends a second command REQ2, which is successfully transmitted to the Edge Proxy 230. The Edge Proxy 230 sends a response RESP2, but the response is never received by the Remote Proxy 220. Accordingly, the Remote Proxy 220 expects to receive a response within a certain predetermined period of time. If the Remote Proxy 220 does not receive a response within that predetermined period of time, the Remote Proxy 220 re-sends its command REQ2, and the Edge Proxy 230 re-sends its response RESP2. In one example, the predetermined period of time can be 3 seconds; however, any suitable time can be utilized either greater or less than 3 seconds.

In accordance with the NACK protocol, if all requests are served and all responses are received for those requests, there is no need to send any NACK, so no additional overhead is added. The protocol only acts when it is needed so that no added any additional overhead that may affect Bandwidth consumption or performance in the network.

In one embodiment of the invention, each request that is transmitted by the Remote Proxy 220 can have a sequential incremental number that the Remote Proxy 220 includes in the header. The header can be an internal protocol header that is added in addition to the normal HTTP header. The header can indicate other information, such as the type of message and sequence ID, as well as to indicate if a message is a NACK message, a request, or a response. Each request is tracked by the Remote Proxy 220 until a successful response is received by the Remote Proxy 220 and sent to the browser at the User Terminal 210. The Edge Proxy 230 is aware of all sequences and can quickly detect an out of sequence request or duplicate request as well. For example, the sequential number may be automatically incremented by one with each message (e.g., each message receives a sequential number that is one greater than the last message). When an out of sequence is detected, the Edge Proxy 230 will wait for few seconds to be sure that the sequence is not out of order. If the lost sequence never arrives, the Edge Proxy 230 will notify the Remote Proxy 220 to send again the lost sequence, such as by a negative acknowledgement (NACK) message.

On the other hand if the Remote Proxy 220 does not receive a NACK signal or a response within a predetermined period of time, the Remote Proxy 220 will resend the request. However, there are two possible scenarios, as shown in FIG. 5. First, the request REQ1 was never received at the Edge Proxy 230 and as a result the Edge Proxy 230 does not transmit a response RESP1 and does not send a NACK to the Remote Proxy 220. In that case a new request REQ1 is transmitted from the Remote Proxy 220, which is received by the Edge Proxy 230, and a response RESP1 is sent back to the Remote Proxy 220. The process can be repeated up to 3 times, so that the Remote Proxy 220 can wait for a predetermined period of time (e.g., almost 2 minutes) to receive the response RESP1 before notifying the browser at the User Terminal 210 with an HTTP error message.

In the second scenario shown in FIG. 5, the request REQ2 is transmitted by the Remote Proxy 220 and received by the Edge Proxy 230. The Edge Proxy 230 sends a response RESP2, but the response RESP2 is lost or otherwise not received by the Remote Proxy 220. This gets treated the same as the previous case, where the Remote Proxy 230 is responsible to resend the request REQ2 after a predetermined period of time and wait for the response.

Figure 6:
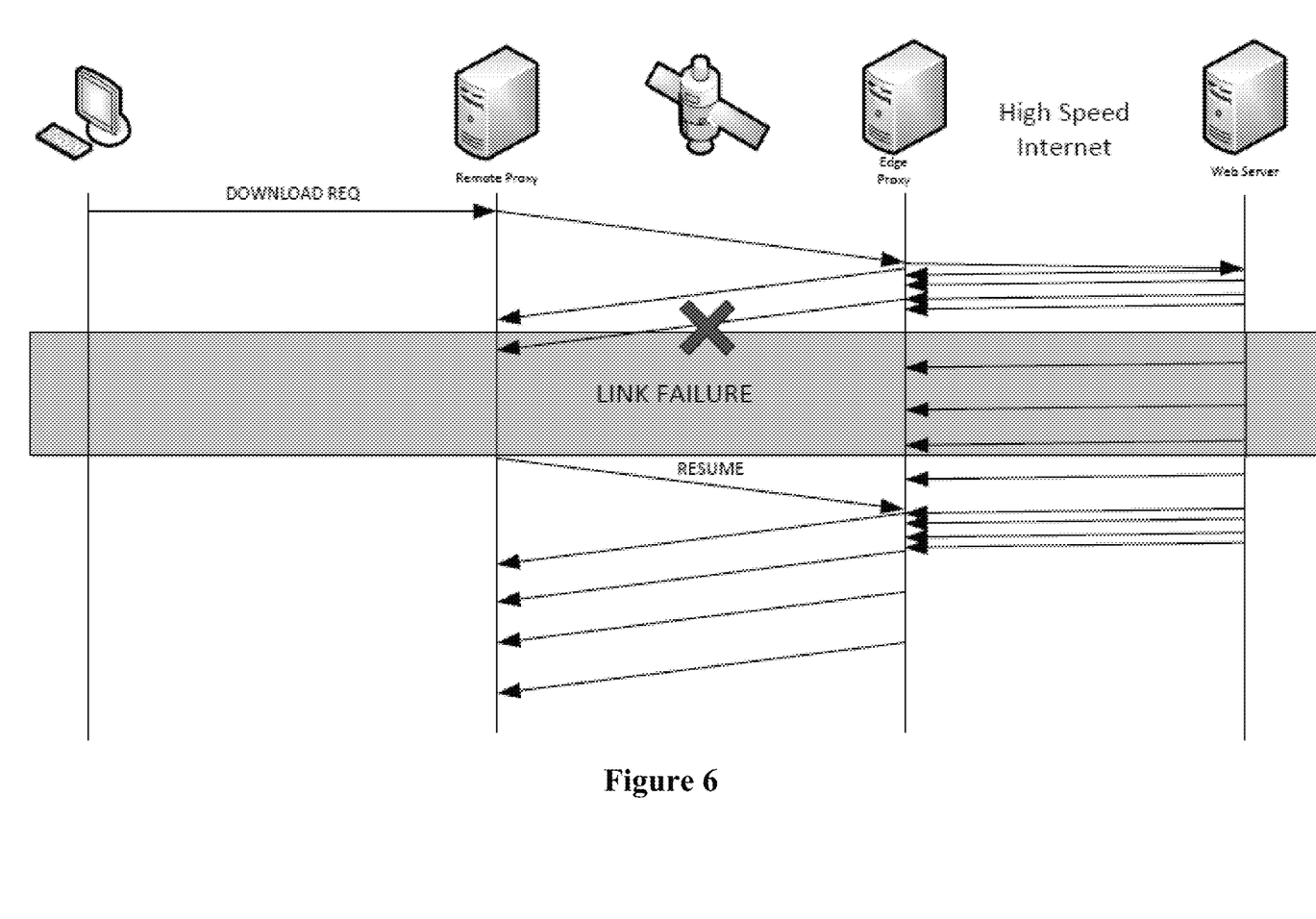
FIG. 6 is a timing diagram illustrating the use of error correction due to a failed link.

Referring to FIG. 6, a download recovery protocol is provided. The download protocol will act only when objects are bigger than a certain size. If files are small (e.g., less than 4 mb) it may be better to allow the NACK protocol to act and request the file again. But if files are bigger than a predetermined size and the download was already started, the download protocol will be utilized. As shown, if the link fails during the download, the download protocol is in place to allow the download to resume without losing any data. When a download is interrupted because the link is failing, and we detect that the static connections are closed or that no data is received in some time, both ends (i.e., the Remote Proxy 220 and the Edge Proxy 230) automatically triggers some actions.

First, the Edge Proxy 230 instead of aborting the download, will reduce the speed of the download to maintain the connection established with the Web Server and will save the file in a local file. Second, the Remote Proxy 220 will monitor when static connections are reestablished and will send a resume with the last byte received. Third, the Edge Proxy 230 will save (e.g., in a storage device such as a database or memory) the file for a predetermined period of time (e.g., default 30 min) and when the download resume signal is received from the Remote Proxy 220, the Edge Proxy 230 will continue sending the data to the Remote Proxy 220. Fourth, if the browser closes the download connection to the Remote Proxy 220 before the Remote Proxy 220 can reestablish the connection, the Remote Proxy 220 will not send a resume command signal to the Edge Proxy 230 and the file will be discarded. Of course, alternative embodiments can be provided. For instance, instead of the Remote Proxy 220 determining that a connection has been reestablished, the Edge Proxy 230 can determine that the connection has been reestablished, and continue transmission of the download and indicate the last byte transmitted (or repeating several bytes that were transmitted just before the failed connection).

HTTPS Optimization

Since HTTPS represents more than 60% of the web traffic, it is very important to optimize this traffic the same way we do for HTTP. However this cannot be done without the user explicit permission. The users need to accept us as a Trusted Proxy to intercept HTTPS traffic with the only intention of optimized it. For that reason, an application in the user's device is needed to install a Root Certificate that allows any application that use HTTPS to trust SSL Certificates generated by us and to request user's authorization to send all the HTTPS traffic through our proxy.

So, in order to optimize HTTPS traffic, end users will need to install a small applications in their mobile devices (smartphone, etc.) and read and accept our disclaimer. Another function of this application will be to automatically detect our proxy and configure it in the system settings of the device. The application can detect the Proxy using a broadcast protocol in the LAN to advertise the presence of the Proxy, or request the IP of the proxy calling an API in a central Web console that knows the locations of all the remote proxies provisioned.

For HTTPS no private data identified in HTTP Headers as a part of the HTTP protocol is stored in the cache 221. Private data is part of the HTTP standards and the decision of what data is private or public is done by the web developer of the web site received from the Web Server 240. Private data is received in the HTTP response header and marked to be private. Private data can include common JavaScript, Images and Videos. And all the information will be encrypted during transmission end to end from the Web Server 240 to the User Terminal 210 and back to the Web Server 240 using encryption standards.

Multicast HTTP

Returning to FIGS. 3 and 4, the system 200 has both a unicast mode of operation and a multicast mode of operation (though other suitable modes may also optionally be provided, such as a broadcast mode). Those modes can be the same as those discussed in U.S. Pat. No. 8,954,600, which is herein incorporated by reference. In the unicast mode, the user has requested unicast data (e.g., less-popular web sites or websites having highly user-customized information) at the browser, which is not broadcast data and therefore has not been previously broadcast to the user computer or stored in the local cache 221. Instead, the user requests the single desired web page from the Remote Proxy 220.

For instance, the multicast mode can be used to send information that is accessed by a large subset of users from a single website to a large subset of User Terminals 210, such as popular websites or information. The information is continuously or periodically updated and multicast so that it is immediately available at the user computers 210 when subsequently requested by the user.

All of the communications (i.e., command signal 222 and response signals 234, 238) between the Remote Proxy 220 and the Edge Proxy 230 may be transmitted via the satellite 300 in the unicast mode.

As mentioned, the cache 221 is utilized if the same information has been previously requested and stored in the cache device 221. So, in order to increase the range of plurality of the users, we are not only getting the requests of a group of users in the same location or network. The cache 221 can also cover the complete satellite footprint in a particular geographical area of the world in C/Ku bands for continents or oceans or cities with Ka bands, as illustrated in FIG. 4.

Knowing the behavior of users in all remotes that are using the system 200 located in the same footprints as the multicast networks (i.e., transmissions over the multicast satellite 300a, which may the same or different from the unicast satellite 300b), the system 200 can determine the most popular web site or trending requested URLs with an intelligent algorithm that will detect if web sites are for the public and if they will have an impact to be pre-fetch those sites to be sent to all the Cache Devices 221 in same Multicast Network covered for the same Footprint in the same area. All remote proxies 220 may be connected to only one Multicast Network satellite 300a available in one particular Satellite Footprint. When a Remote Site with the system 200 is able to connect to a particular multicast, all the user's behavior will be accounted for that particular Multicast to determine the popular web site.

In case the web site fulfils the necessary conditions of having a good probability of being hit by the cache mechanism, we determine the frequency that a particular popular web site needs to be refresh based on how frequent users request the web pages and how frequent the content of the web pages change. The conditions defined to determine if a webpage should be in the Popular List of Web site are: (1) Frequency of the Homepage is hit by users. (2) Amount of different users hitting same domain. (3) Amount of different requests of pages inside the same domain.

The navigation level is determined based on the amount of different pages requested by users. The Edge Proxy 230 receives the user requests from the unicast satellite 300b, and stores that information in the Database as raw data composed by all the details like Domains, Amount of User, Total Request and much more done within an hour. The crawler/multicast server 250 receives query the raw data from the various Edge Proxies 230 (e.g., every 30 minutes) and determines various statistical and non-statistical information, such as calculating the frequency and importance based in the amount of people that repeatedly use the website. That information may then be used by the Crawler & Multicast server 250 (FIG. 4), for instance the multicast server 250 can transmit the most popular sites to one or more Remote Proxies 220 via the multicast satellite 300a. For a particular web site domain, the crawler 250 navigates to that page via the server 240, obtains all the objects (Images, Videos, etc.), creates a compressed package, and sends it over the Multicast network satellite 300*a* (which may differ from the Unicast Network 300*b* for that particular area covered by the Satellite footprint). The packages will be received in the Remote Proxy 220 listening to that Particular Multicast that is assigned for that Footprint and once the data arrives will be stored to the Cache 221 at the Remote proxy 220.

The crawler & multicast servers 250 may be loaded with hundreds of real Browsers (FIG. 4) generate those packages by navigating page by page like a search spider and intelligently determining the most important pages that need to be navigated, e.g., home pages, sections and relevant pages inside those sections. This process is done with at least a predetermined frequency. Packages have incremental information, which means that only new information since the last package was generated will be added in the new package. That keeps the size of the packages proportionally small to the changes in the website.

A Multicast Client component can be provided at the Remote Proxy 220. The multicast client may be connected to one specific Multicast Network (communications over the muticast channels of the satellite 300*a*). The multicast client may receive all the packages generated by the crawlers with all the objects gathered by the Crawler 250 and stores the cached objects in the cache devices 221 at the Remote Proxy 220. Thus, when the User Terminal 210 requests information of the pages pre-fetched by the Crawler 250, it can be retrieved from the cache 221 at the Remote Proxy 220 and the request need not be transmitted to the Edge Proxy 230. For instance, a multicast client at the remote proxy 220 may be associated with North America, and a multicast client at a different remote proxy 220 may be associated with South America. The multicast client knows its location based on the satellite 300 that it communicates with.

A Real Multicast protocol is implemented for trending content that typically are website with a dynamic nature that cannot be pre-fetch, but still are very popular and inside them have public content that can be reused like images and videos. This is the case of Social Networks. The objective of this Real Time Multicast is to be an alternative media to send trending content over multicast instead of unicast. So, when a user requests an object that is classified as a trending content, the object will be sent using Multicast real-time and the user will receive transparently as a normal unicast response, but with the advantage that this particular objects can be cached in thousands of devices at the same time when it is sent, and also, saving Unicast bandwidth.

The process is as follows:

(a) Web sites are categorized by the Crawler 250 as popular because the statistical information stored by Edge Proxy 230. However, sites can be dynamic and include private information like FACEBOOK® or TWITTER® (which are content generated only for the user), though the objects inside (like images and video) can be marked as a public object in HTTP Header.

(b) An object is requested by Terminal 210, that request is sent to Remote Proxy 220 and sent to the Edge Proxy 230 to determine if the site is popular using the statistical information, and response is received from Web Server 240. If the HTTP header in the response indicates that the object is public, then the data is therefore cacheable and can be multicast. Accordingly, the object is multicast over the satellite 300.

(c) To multicast the Object, the Edge Proxy 230 calls an API of the Multicaster 250 (FIG. 4) to request to send that object over the Real-time Multicast. Based on the load of the Multicast Network that has a finite amount of Bandwidth, the Multicaster 250 will accept or deny that object.

(d) If object is denied, the Edge Proxy 230 sends the Response Normally to the Remote Proxy 220.

(e) The Multicaster queues all the responses that were accepted to be sent over multicast and using a prioritized channel over same Multicast Network is going to send one by one all the objects in the queue. Packages generated by the Crawler can be delayed because no one is waiting for it, but Real Time multicast needs to send Object Response as fast as it can because one person is waiting for it.

In one embodiment of the invention, the system 200 includes operation by one or more processing devices, including the Remote Proxy 220 and the Edge Proxy 230. And the devices that they communicate with also include processing devices, such as the User Terminal 210 and Web Server 240. It is noted that the processing devices of each of those devices can be any suitable device, such as a server, processor, microprocessor, PC, tablet, smartphone, mainframe or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, Zigbee, etc.). The information may be stored on a computer hard drive, on a CD ROM disk or on any other appropriate data storage device, which can be located at or in communication with the processing device. The entire process is conducted automatically by the processing device, and without any manual interaction. Accordingly, the communications and operations can occur substantially in real-time without any delays.

Within this specification embodiments have been described in a way which enables a clear and concise specification to be written, but it is intended and will be appreciated that embodiments may be variously combined or separated without departing from spirit and scope of the invention. For example, though the embodiment of FIG. 3 shows the HTML response 224 transmitted before the objects response 226, the Edge Proxy 230 or the Remote Proxy 220 can wait until all the objects are received before transmitting the HTML response to the Remote Proxy 220 or User Terminal 210, respectively.

Accordingly, a first embodiment of the invention includes a system for communicating data from a first computer to a second computer remotely located from the first computer, the system comprising a first proxy device configured to receive a request from the first computer and transmit the request via satellite; and a second proxy device configured to receive the request from the first proxy device via satellite and transmit the first request to the second computer via a high speed connection, said second proxy device receiving a response from the second computer and transmitting the response via satellite, wherein said first proxy device is further configured to receive the response from the second proxy device via satellite and transmit the response to the first computer.

In a second embodiment of the invention, the request comprises a GET HTTP command signal. In a third embodiment based on any of the earlier embodiments, the second proxy device is further configured to review the response and determine further information needed, and transmit a further request to the second computer for the further information. In a fourth embodiment based on any of the earlier embodiments, the second proxy device is further configured to receive a further response from the second computer and transmit the further response to the first proxy device via satellite, and wherein the first proxy device is further configured to receive the further response via satellite and transmit the further information to the first computer. In a fifth embodiment based on any of the earlier embodiments, the request is for a website. In a sixth embodiment based on any of the earlier embodiments, the first computer is a user terminal and the second computer is a web server.

In a seventh embodiment based on any of the earlier embodiments, the first proxy device is further configured to determine if a response is not received from the second proxy device within a predetermined time, and re-transmit the request via satellite if the response is not received from the second proxy device within the predetermined time. In an eight embodiment based on any of the earlier embodiments, the second proxy device transmits the response over a satellite link and the first proxy device receives the response over the satellite link, and the first and second proxy devices are further configured to determine if the satellite link fails during transmission of the response and to resume the transmission of the response once the satellite link resumes.

In a ninth embodiment based on any of the earlier embodiments, a cache is in communication with the first proxy device. In a tenth embodiment based on any of the earlier embodiments, said second proxy is further configured to determine popular websites and multicast popular websites to the first proxy device via satellite, said first proxy device configured to store the popular websites at said cache. In an eleventh embodiment based on any of the earlier embodiments, said first proxy device is further configured to determine if the request from the first computer corresponds to information stored in the cache, retrieve the requested information from the cache, and transmit the requested information to the first computer.

The foregoing description and drawings should be considered as illustrative only of the principles of the invention. The invention is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A system for communicating data from a first computer to a second computer remotely located from the first computer, the system comprising:
    the first computer configured to enable a user to accept and install a root certificate a first proxy device to allow the first proxy device to access encrypted data being transmitted between the first computer and a device accessible via satellite;
    the first proxy device configured to receive a request from the first computer and transmit the request via satellite;
    the first proxy configured to identify itself to the first computer using the root certificate and to obtain root access to HTTPS traffic sent by the first computer;
    a second proxy device configured to receive the request from the first proxy device via satellite and transmit the request to a second computer via a high speed connection, the second proxy device receiving a response from the second computer and transmitting the response via satellite;
    the first proxy device further configured to receive the response from the second proxy device via satellite, access content of the response using the root certificate, transmit the response to the first computer along with pre-fetch content, pre-fetch content being HTML and objects that the second proxy device recognizes will be requested by the first computer as a result of an inspection of the content of the response using the root certificate;
    a crawler and multicaster, in communication with the second proxy device, configured to review the request, using the root certificate, and compare data sought by the request to a single database of popular requests used for all of a set of multiple proxy devices and, when the request seeks data that appears in the database of popular requests, instruct the second proxy device to transmit the response from the second proxy device to each of the multiple proxy devices using a multicast protocol; and
    wherein each of the multiple proxy devices cache the response to the request sent using the multicast protocol.

2. The system of claim 1, wherein the request comprises a GET HTTP command signal.

3. The system of claim 2, wherein the second proxy device is further configured to review the response and determine further information needed, and transmit a further request to the second computer for the further information.

4. The system of claim 2, wherein the second proxy device is further configured to receive a further response from the second computer and transmit the further response to the first proxy device via satellite, and wherein the first proxy device is further configured to receive the further response via satellite and transmit the further information to the first computer.

5. The system of claim 1, wherein the first computer is a user terminal and the second computer is a web server.

6. The system of claim 1, wherein said first proxy device is further configured to determine if a response is not received from the second proxy device within a predetermined time, and re-transmit the request via satellite if the response is not received from the second proxy device within the predetermined time.

7. The system of claim 1, wherein the second proxy device transmits the response over a satellite link and the first proxy device receives the response over the satellite link, and the first and second proxy devices are further configured to determine if the satellite link fails during transmission of the response and to resume the transmission of the response once the satellite link resumes.

8. The system of claim 1, wherein said first proxy device is further configured to determine if the request from the first computer corresponds to information stored in a cache, retrieve the requested information from the cache, and transmit the requested information to the first computer.

9. A system for communicating data from a User Terminal to a Web Server remotely located from the User Terminal, the system comprising:
    the first User Terminal configured to enable a user to accept and install a root certificate a remote proxy device to allow the remote proxy device to access encrypted data being transmitted between the User Terminal and a device accessible via satellite;
    the remote proxy device configured to obtain root access to the User Terminal so as to ensure access to all HTTPS traffic sent by the User Terminal, to receive a GET HTTP request from the User Terminal, and transmit the GET HTTP request via satellite, the GET HTTP request associated with a website;
    an edge proxy device containing both a crawler and multicaster configured to receive the GET HTTP request from the remote proxy device via satellite, transmit the GET HTTP request to the Web Server via a high speed connection, receive an HTML response from the Web Server, and transmit the HTML response via satellite, the edge proxy device further configured to access the HTML response using the root access to the HTTPS traffic to review the HTML response, determine whether the website appears in a single popular websites database used for all of a set of multiple proxy devices, determine objects for the website, transmit a further request to the Web Server for the objects, receive the objects, and, when the website appears in the popular websites database, transmit the objects using a multicast or unicast protocol to each of the set of multiple proxy devices, including the remote proxy device, via satellite;

the remote proxy device further configured to receive the HTML response, to obtain the further response including pre-fetch content, the pre-fetch content being HTML and objects that the second proxy device recognizes will be requested by the User Terminal as a result of an inspection of the response using the root certificate, and transmit the HTML response and the further response to the User Terminal; and wherein the multiple proxy devices cache the response to the request sent using the multicast protocol.

10. The system of claim 9, wherein the edge proxy device is further configured to review the response and determine further information needed, and transmit a further request to the Web Server for the further information.

11. The system of claim 10, wherein the edge proxy device is further configured to receive a further response from the Web Server and transmit the further response to the remote proxy device via satellite, and wherein the remote proxy device is further configured to receive the further response via satellite and transmit the further information to the User Terminal.

12. The system of claim 8, wherein said remote proxy is further configured to determine if a response is not received from the edge proxy device within a predetermined time, and re-transmit the request via satellite if the response is not received from the edge proxy device within the predetermined time.

13. The system of claim 8, wherein the edge proxy device transmits the response over a satellite link and the remote proxy device receives the response over the satellite link, and the remote and edge proxy devices are further configured to determine if the satellite link fails during transmission of the response and to resume the transmission of the response once the satellite link resumes.

14. The system of claim 8, further comprising a cache in communication with the remote proxy device.

15. The system of claim 9, wherein said remote proxy device is further configured to determine if the request from the User Terminal corresponds to information stored in a cache, the information based upon a prior multicast, retrieve the requested information from the cache, and transmit the requested information to the User Terminal.

16. The system of claim 1 wherein the crawler and multicaster are within the second proxy, and wherein the response is sent only once to both the first proxy and to the multiple proxy devices, all via the multicast protocol.

17. A system for communicating data from a first computer to a second computer remotely located from the first computer, the system comprising:

the first computer configured to enable a user to accept and install a root certificate a first proxy device to allow the first proxy device to access encrypted data being transmitted between the first computer and a device accessible via satellite;

the first proxy device configured to receive a request for a website from the first computer and transmit the request via satellite to a second proxy device;

the first proxy configured to identify itself to the first computer using the root certificate and to obtain root access to HTTPS traffic sent by the first computer;

a second proxy device configured to receive the request from the first proxy device via satellite and transmit the request to a second computer via a high speed connection, the second proxy device receiving a response from the second computer and transmitting the response via satellite;

the first proxy device further configured to receive the response from the second proxy device via satellite, access content of the response using the root certificate, transmit the response to the first computer along with pre-fetch content, pre-fetch content being HTML and objects requested by a browser that the second proxy device recognizes will be requested by the first computer as a result of the inspection of the content of the response using the root certificate;

the second proxy device containing both a crawler and multicaster configured to receive the request from the first proxy device via satellite, transmit the first request to the second computer via a high speed connection, said second proxy device receiving a response from the second computer, review the response using the root certificate, and, when the website appears in a single database of popular websites used for all of a set of multiple proxy devices, transmitting the response using a multicast protocol via satellite to the first proxy device and each of the multiple proxy devices so that the website may be cached by the multiple proxy devices;

the first proxy device further configured to receive the response from the second proxy device via satellite and transmit the response to the first computer; and wherein the multiple proxy devices cache the response to the request sent using the multicast protocol.

18. The system of claim 17 wherein the second proxy is further configured to:

open a plurality of simultaneous communication channels between the first proxy and the second proxy; and to transmit data from the second proxy to the first proxy using as much bandwidth as is available on the plurality of simultaneous communications channels to respond to any request from the first proxy, even while awaiting responses from one or more other web servers responsive to other requests.

19. The system of claim 1 wherein the second proxy is further configured to:

open a plurality of simultaneous communication channels between the first proxy and the second proxy; and to transmit data from the second proxy to the first proxy using as much bandwidth as is available on the plurality of simultaneous communications channels to respond to any request from the first proxy, even while awaiting responses from one or more other web servers responsive to other requests.

20. The system of claim 9 wherein the second proxy is further configured to:

open a plurality of simultaneous communication channels between the edge proxy and the remote proxy; and to transmit data from the remote proxy to the edge proxy using as much bandwidth as is available on the plurality of simultaneous communications channels to respond to any request from the edge proxy, even while awaiting responses from one or more other web servers responsive to other requests.

* * * * *